Figure 7:
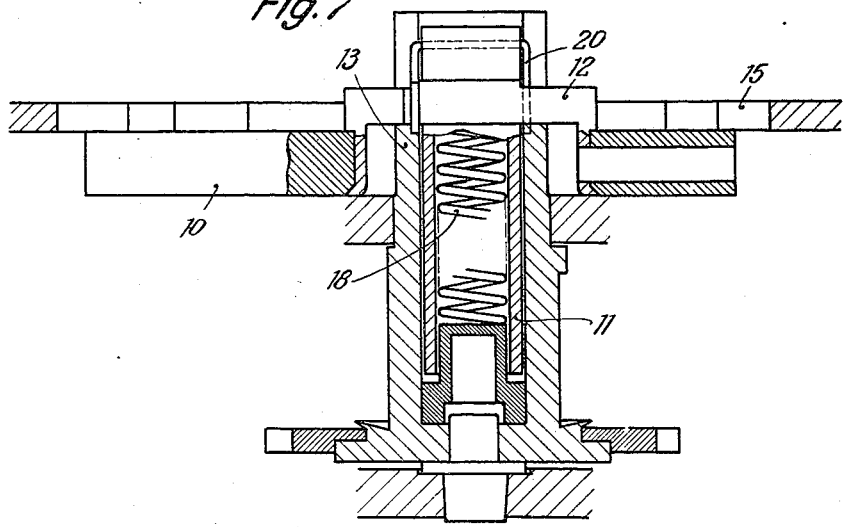

May 24, 1932.   P. LIEBERGELD   1,860,256
MECHANICALLY OPERATED TIME FUSE FOR PROJECTILES
Filed Jan. 13, 1931    4 Sheets-Sheet 1
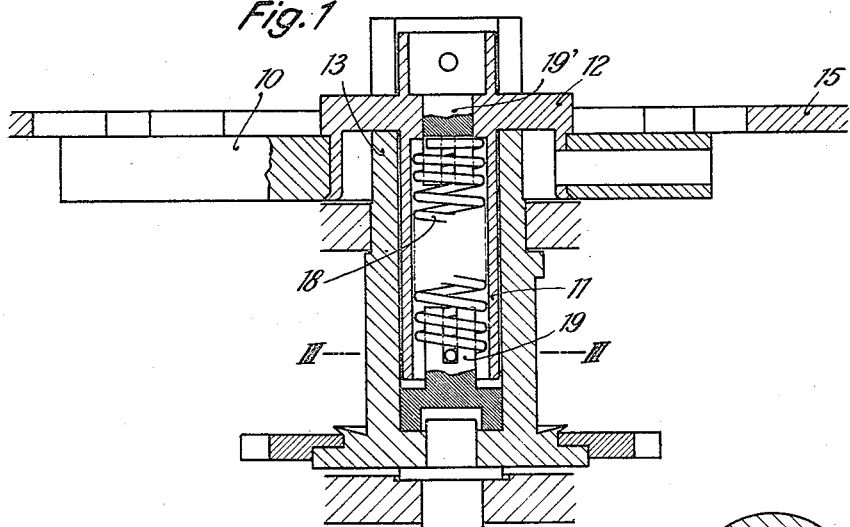
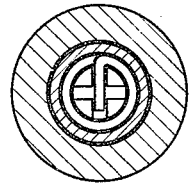
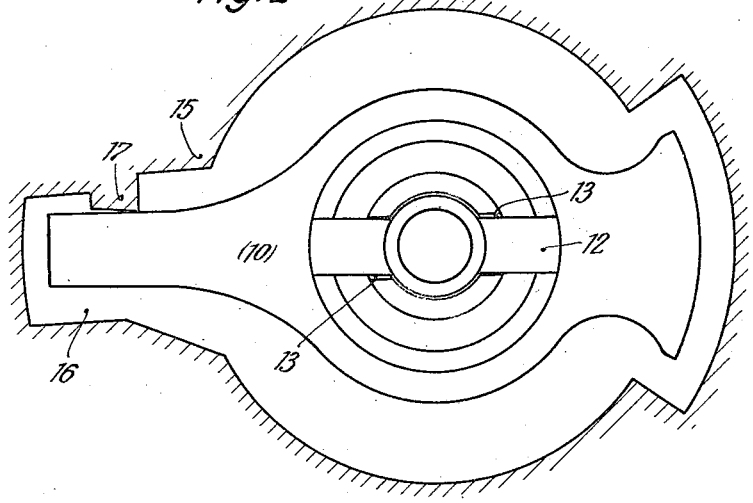

May 24, 1932. P. LIEBERGELD 1,860,256
MECHANICALLY OPERATED TIME FUSE FOR PROJECTILES
Filed Jan. 13, 1931 4 Sheets-Sheet 2
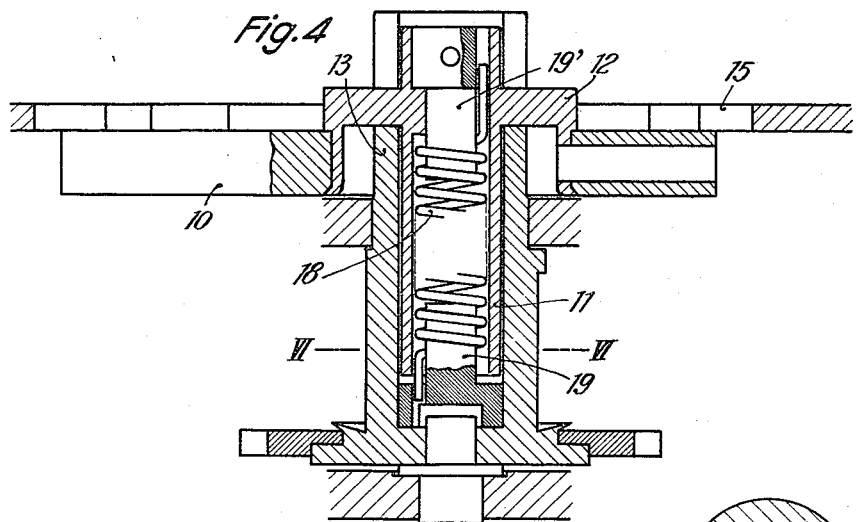
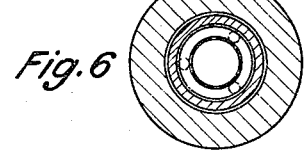
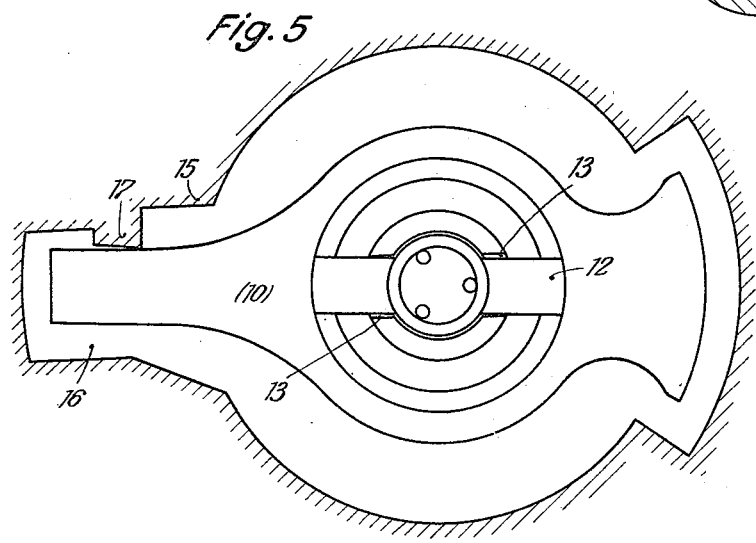

May 24, 1932.  P. LIEBERGELD  1,860,256

MECHANICALLY OPERATED TIME FUSE FOR PROJECTILES

Filed Jan. 13, 1931  4 Sheets-Sheet 4

Patented May 24, 1932

1,860,256

UNITED STATES PATENT OFFICE

PAUL LIEBERGELD, OF BAD THAL, GERMANY

MECHANICALLY OPERATED TIME FUSE FOR PROJECTILES

Application filed January 13, 1931, Serial No. 508,521, and in Germany January 21, 1930.

The invention relates to mechanically operated time fuse, of the type in which the release is effected by a rotating pointer. The drive of such a pointer is usually effected by clockwork and its conduction by the centre wheel spindle of the clockwork is effected by its engagement by means of a web in a guide slot of the centre wheel spindle. The detonation takes place in the case of such time fuses as soon as the pointer, in its rotation, arrives at a recess provided with a bevelled off nose of a timing ring over which it slides; at this moment the pointer is moved by means of a compression spring acting axially on it through the recess, thereby effecting at the same time the release of the detonating mechanism. The period of rotation of the pointer can be regulated as desired by turning the timing ring. The interval of time between the firing and detonation is hereby fixed at the same time.

It will be seen from the foregoing that it is necessary in the case of such time fuses that a certain angular position of the pointer to a certain angular position of the centre wheel spindle shall be definitely fixed or, in other words, that the pointer shall possess no lateral play in relation to the centre wheel spindle, otherwise it might occur that the pointer would advance with respect to the centre wheel spindle shortly before sliding off from the point of the nose and release the ignition mechanism at an earlier moment than that intended. With the extraordinary firing velocities which are employed at the present time, time intervals of as little as tenths of seconds are sufficient to cause the detonation to take place some hundred metres in advance.

The object of the invention is to ensure the uniformity of movement of the centre wheel spindle and pointer, including immediately before the sliding off of the pointer from the nose of the drop slot of the timing ring, thereby increasing the accuracy and uniformity of the running down of the detonating device. This is effected by allowing a torsion spring to act on the pointer, bringing it into close contact with the walls of the guide slot carrying it along. This practically excludes any side play of the pointer in relation to the centre wheel spindle.

The idea of the invention may be put into realization by fixing the ends of the above mentioned compression spring and by utilizing the torsional moment of this spring. The fixing is suitably effected by introducing the bent over ends of the spring into recesses of inserted bodies of the pointer and of the centre wheel spindle. Instead of this, however, an additional torsion spring may be arranged beside the axially acting compression spring.

The subject of the invention is shown in the accompanying drawings in a number of examples of construction.

Figure 8:
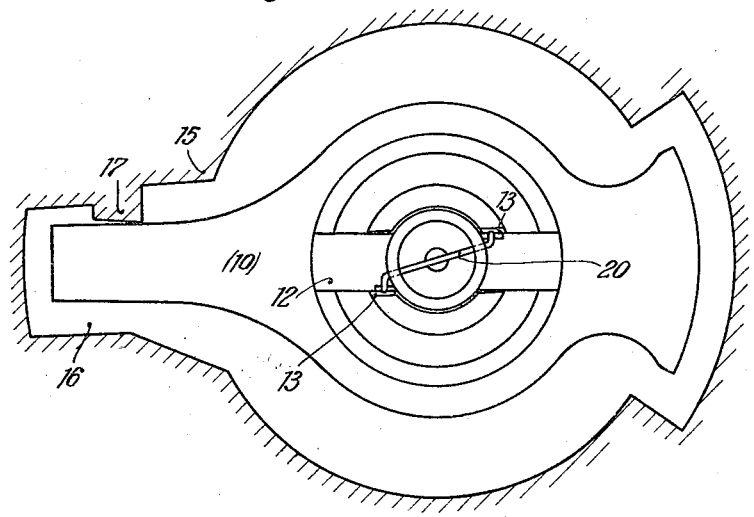
Figure 9:
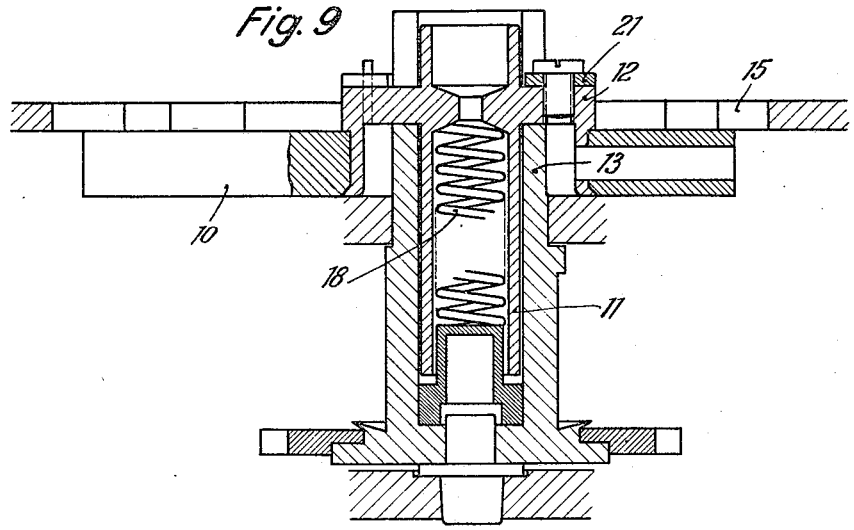
Figure 10:
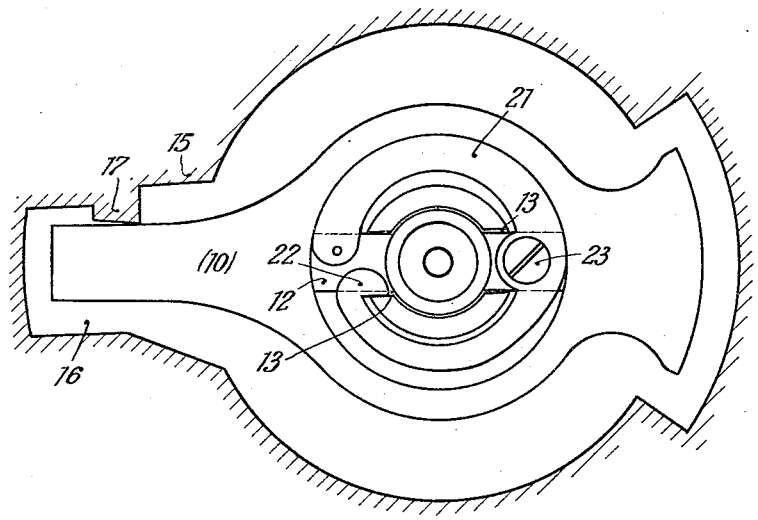

Fig. 1 is a longitudinal section,
Fig. 2 a view from above,
Fig. 3 a section through the line III—III of Fig. 1, of a form of construction in which the compression spring is simultaneously formed as a torsion spring,
Figs. 4, 5 and 6 are representations corresponding to Figs. 1 to 3 of a further similar form of construction,
Figs. 7 and 8 are longitudinal section and view from above of a form of construction with separate torsion spring,
Figs. 9 and 10 are representations corresponding to Figs. 7 and 8 of a similar form of construction.

As will be seen from the figures, the pointer 10 is equipped with the pointer lining 11, which engages with a web 12 in the axially extending guide slot of the hollow centre wheel spindle 13. The drive of the centre wheel spindle is effected in known manner by means of a draw spring of a clockwork. By turning the centre wheel spindle 13, the pointer 10 is also put into rotation and passes along the under side of the timing ring 15, which is provided in known manner with a recess 16. On one edge of the recess is arranged a nose 17 provided with a bevel edge from which the pointer slides at the moment of the detonation and is thrown upwards by the axially acting coil spring 18.

This coil spring is placed inside the centre wheel spindle. Its two ends are bent over radially towards the centre and each of them is fixed there in an insertion 19 and 19′ respectively, which are rigidly fixed to the pointer and centre wheel spindle respectively in any convenient manner (Fig. 3). The insertions are provided with grooves to take the ends of the springs. In order to facilitate the insertion of the ends of the springs in the inserted pieces, two grooves each are provided which together form a cross.

The torsional moment is given to the coil spring by turning the pointer once or more in the direction of rotation of the clockwork prior to being placed on the centre wheel spindle but after the fixing of the spring to the pointer and to the centre wheel spindle. If the web of the pointer is now introduced into the guide slot of the centre wheel spindle, the torsional moment of the spring has the effect of causing the pointer to lie close to the edge of the guide slot opposite to its direction of turning. All lateral play between the carrying surface of the centre wheel spindle and the pointer is thereby avoided.

The form of construction in accordance with Figs. 4 to 6 is essentially the same as that described above, but in this case the ends of the coil spring 18 are bent over axially and not radially and are accordingly fixed in longitudinal bores of the inserted pieces 19 to 19'. As will be seen from Figs. 5 and 6, a number of longitudinal bores can be arranged on the periphery of the inserted pieces in order to facilitate the introduction of the ends of the springs. The torsional moment is given to the coil spring in exactly the same way as described in the above example of construction.

In Figs. 7 and 8 the coil spring 18 is not formed as a torsion spring. On the other hand a spring bow 20 is inserted like a splint at the upper end of the centre wheel spindle, the two shanks of the bow acting on opposite sides of the web 12, as is clearly to be seen in Fig. 7. In order to ensure the engagement of the ends of the shanks in the web, the latter is provided with small recesses. The shanks have the inclination to cause the web to lie close to the carrying surfaces of the guide slot.

In Figs. 9 and 10 an annular turn spring 21 lies on the web, one end being riveted to the web and the other end carrying a nose 22, which is in contact with the non-carrying wall of the guide slot, thereby causing the web to lie close to the carrying wall of the guide slot.

I claim:—

1. In a mechanically operated time fuse having a rotating release pointer for detonating control, a clockwork, a hollow center wheel spindle in driving connection with said clockwork and having an axially extending guide slot, a torsion spring adapted to act on the pointer in combination with said guide slot said spring being initially stressed to keep said pointer in close contact with the carrying walls of said guide slot.

2. In a mechanically operated time fuse having a rotating release pointer for detonating control, a center wheel spindle, a compression spring adapted to act on the pointer in an axial direction, and means for anchoring the two ends of said spring to the pointer and the centre wheel spindle respectively adapted to put the compression spring under initial torsional stress.

3. In a mechanically operated time fuse having a rotating release pointer for detonating control, a center wheel spindle, a compression spring adapted to act on the pointer in an axial direction, a pair of recessed spring driving devices carried by the pointer and centre wheel spindle respectively adapted to engage the ends of the compression spring so as to put it under initial torsional stress.

4. In a mechanically operated time fuse having a rotating release pointer for detonating control, a web associated with the pointer, a center wheel spindle having a guide slot, a bowed torsion spring adapted to coact with the centre wheel spindle at the centre part and at its ends to coact on opposite sides with the web of the pointer and in a guide slot.

5. In a mechanically operated time fuse having a rotating release pointer for detonating control, a center wheel spindle, a web associated with the pointer, an annular torsion spring adapted at one end to be fixed to the web of the pointer and at the other end to engage in the guide slot of the centre wheel spindle.

PAUL LIEBERGELD.